(12) United States Patent
Hofstee et al.

(10) Patent No.: US 8,516,272 B2
(45) Date of Patent: Aug. 20, 2013

(54) SECURE DYNAMICALLY RECONFIGURABLE LOGIC

(75) Inventors: H Peter Hofstee, Austin, TX (US);
James A. Kahle, Austin, TX (US);
Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 12/827,726

(22) Filed: Jun. 30, 2010

(65) Prior Publication Data

US 2012/0005473 A1 Jan. 5, 2012

(51) Int. Cl.
*G06F 11/30* (2006.01)
*G06F 15/16* (2006.01)
*G06F 15/177* (2006.01)
*H04L 12/28* (2006.01)
*H04J 3/02* (2006.01)
*H04J 3/16* (2006.01)
*H04K 1/00* (2006.01)

(52) U.S. Cl.
USPC ............... 713/191; 726/5; 370/410; 370/462; 370/465; 709/220; 380/28

(58) Field of Classification Search
USPC ......... 713/168–174, 182–186, 202; 709/225, 709/229; 726/2–8
See application file for complete search history.

(56) References Cited

U.S. PATENT DOCUMENTS

| | | | |
|---|---|---|---|
| 7,203,842 B2 | 4/2007 | Kean | |
| 7,215,771 B1 | 5/2007 | Hamlin | |
| 7,275,163 B2 | 9/2007 | Cocchi et al. | |
| 7,502,941 B2 | 3/2009 | Michael et al. | |
| 7,508,942 B2 | 3/2009 | Candelore | |
| 2004/0213285 A1* | 10/2004 | Stevenson et al. | 370/465 |
| 2007/0098153 A1 | 5/2007 | Nishikawa | |
| 2007/0283311 A1 | 12/2007 | Karoubalis et al. | |
| 2008/0256352 A1 | 10/2008 | Chow | |
| 2009/0132821 A1 | 5/2009 | Matsuzaki | |
| 2010/0132018 A1* | 5/2010 | Takala et al. | 726/5 |

FOREIGN PATENT DOCUMENTS

JP 2009043094 2/2009

OTHER PUBLICATIONS

Dandalis, Andreas, "Dynamic Logic Synthesis for Reconfigurable Hardware", University of Southern CA, vol. 6309B of Dissertations Abstracts International, 2001, p. 4289, 184 pages.
Kwok, Tai-On T., "High Performance Embedded Reconfigurable Computing: Data Security and Media Processing Applications", vol. 45/01 of Masters Abstracts of Dissertations Abstracts International, p. 413, 2005, 99 pages.
Perez, Oscar et al., "The Use of Runtime Reconfiguration on FPGA Circuits to Increase the Performance of the AES Algorithm Implementation", Journal of Universal Computer Science, vol. 13, No. 3, 2007, pp. 349-362.

* cited by examiner

*Primary Examiner* — Evans Desrosiers
(74) *Attorney, Agent, or Firm* — Francis Lammes; Stephen J. Walder, Jr.; Matthew B. Talpis

(57) ABSTRACT

A mechanism for securely and dynamically reconfiguring reconfigurable logic is provided. A state machine within a data processing system establishes a hardware boundary to the reconfigurable logic within the data processing system thereby forming isolated reconfigurable logic. The state machine clears any prior state existing within the isolated reconfigurable logic. The state machine authenticates a new configuration to be loaded into the isolated reconfigurable logic. The state machine determines whether the authentication of the new configuration is successful. Responsive to the authentication of the new configuration being successful, the state machine loads the new configuration into the isolated reconfigurable logic. The state machine then starts operation of the isolated reconfigurable logic.

22 Claims, 6 Drawing Sheets

SECURE DYNAMICALLY RECONFIGURABLE LOGIC

BACKGROUND

The present application relates generally to an improved data processing apparatus and method and more specifically to mechanisms for secure dynamically reconfigurable logic.

As computers and consumer electronics devices become more connected, platform security becomes increasingly important for everyone from consumers to businesses. For consumers, privacy of data such as credit card numbers and social security numbers has always been of concern, but now new technologies such as voice-over-IP and personal video blogs bring new privacy concerns. And for entertainment content owners, piracy is a major concern as they move toward a virtual form of TV and movie content delivery.

Within this context, the Cell Broadband Engine (Cell BE) offers a processor security architecture that provides a robust foundation for the platform. Until now, because most processor architectures did not provide any security features, security architects relied on software-implemented approaches to provide protection. However, protecting software with software has a fundamental flaw in that the software with the protector role can be compromised as well. Therefore, processor hardware, which is intrinsically less vulnerable than software, needs to be re-thought and re-architected to support the security of the platform.

With the confusing array of security solutions available in the marketplace, it is helpful to clarify what attack model a design is intended to protect against. Although, the Cell BE processor does have defenses against physical attacks, the architecture's main focus is software-based attacks. These attacks can be unleashed simply by executing software code, and often times, the code is available for free from an Internet Web site. In contrast, physical attacks require obtaining extra hardware (such as a mod-chip), or expensive measuring equipment and also require skill in opening up the system to make the necessary changes. Because it is much easier for an individual to copy a software-based attack than a physical attack, a software-based attack will clearly become more widespread and hence more devastating when it is discovered. Furthermore, unlike physical attacks which require physical proximity to the target, software attacks can also be unleashed against a user by an external attacker through the platform's connectivity. Therefore, with software-based attacks, the user can be either the adversary (where the user's software manipulation leads to pirating of content), or the victim (where a virus exposes the user's private data).

While the Cell BE has a dynamically reconfigurable secure programming element, the dynamically reconfigurable secure programming element is limited because the dynamically reconfigurable secure programming element is a fixed-function processor which provides less flexibility than reconfigurable logic. Further, while secure reconfigurable logic exists, it is not dynamically reconfigurable to provide dynamically loadable secured functions within a data processing system. Current secure reconfigurable logic must typically be programmed in a trusted environment and must be returned to this trusted environment to be reconfigured. In practice this means that a trusted configurable logic is only configured once.

SUMMARY

In one illustrative embodiment, a method, in a data processing system, is provided for securely and dynamically reconfiguring reconfigurable logic. The illustrative embodiment establishes a hardware boundary to the reconfigurable logic within the data processing system thereby forming isolated reconfigurable logic. The illustrative embodiment clears any prior state existing within the isolated reconfigurable logic. The illustrative embodiment authenticates a new configuration to be loaded into the isolated reconfigurable logic. The illustrative embodiment determines whether the authentication of the new configuration is successful. The illustrative embodiment loads the new configuration into the isolated reconfigurable logic in response to the authentication of the new configuration being successful. The illustrative embodiment then starts operation of the isolated reconfigurable logic.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism within a data processing system for secure dynamically reconfigurable logic. The illustrative embodiments establish secure operations using a hardware state machine in the data processing system that establishes a hardware boundary such that the logic that is to be secured can only be written to by the hardware state machine. The hardware state machine clears out the prior state of the reconfigurable logic and authenticates a new configuration of the reconfigurable logic using a hardware root of trust (key). Upon successful load and authentication, the hardware state machine starts operation of the reconfigurable logic. If the load and/or the authentication is not successful, the hardware state machine, aborts the load operation, clears the state of the reconfigurable logic, and signals that the isolated load operation was not successful. The illustrative embodiments also provide a communication area, which is considered to be unsecure, that is accessible by both the reconfigurable logic and other components within the data processing system.

Figure 1:
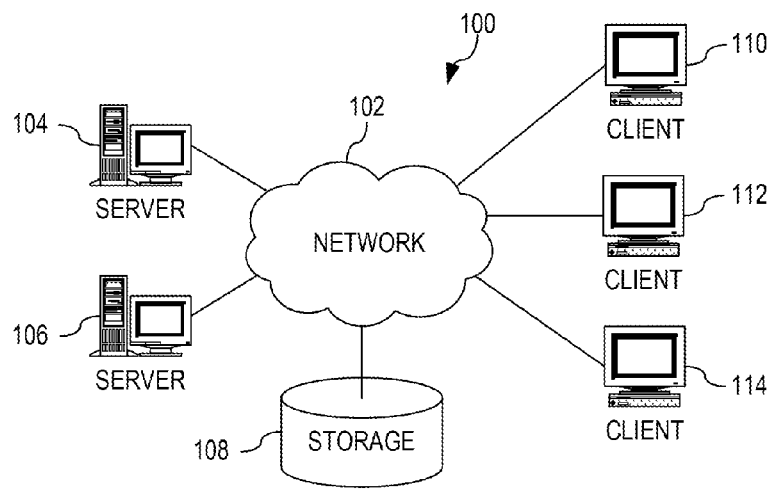
FIG. 1 depicts a pictorial representation of an example distributed data processing system in which aspects of the illustrative embodiments may be implemented.
Figure 2:
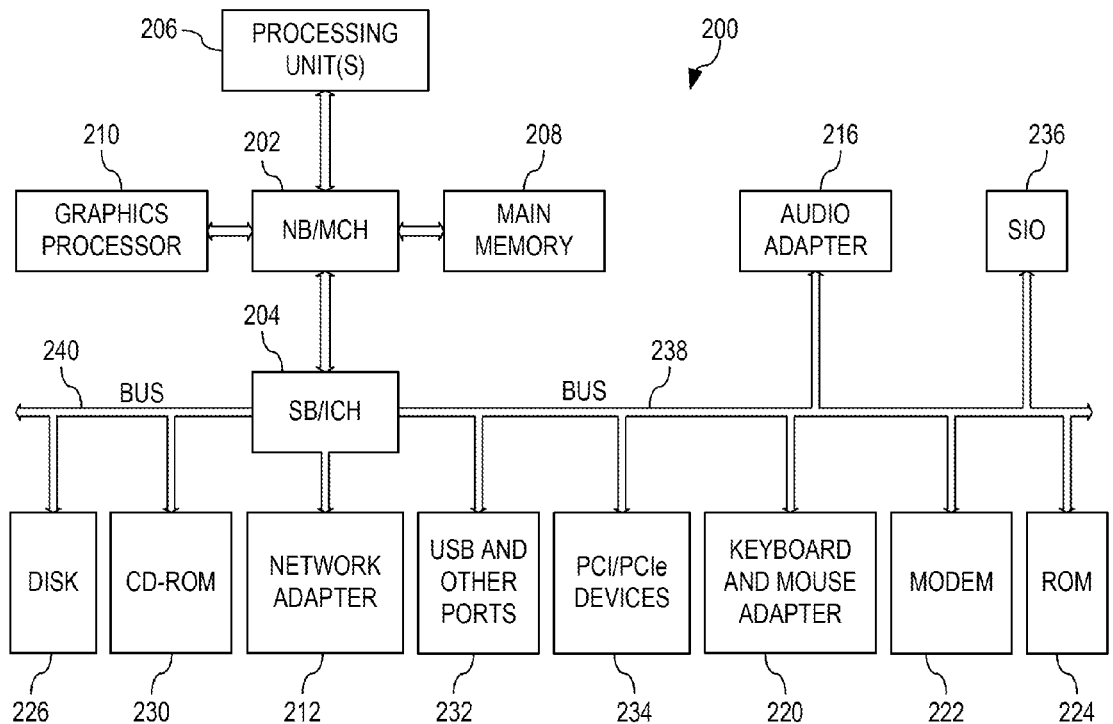
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism that provides secure dynamically reconfigurable logic, this is only an example and is not intended to state or imply any limitation with regard to the features of the present invention. To the contrary, the illustrative embodiments are intended to include distributed data processing environments and embodiments in which a secure dynamically reconfigurable logic mechanism may be implemented.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP). In the depicted example, local area network (LAN) adapter 212 connects to SB/ICH 204. While data processing system 200 depicts NB/MCH 202, SB/ICH 204, processing unit 206, main memory 208, graphics processor 210 and LAN adapter 212 as separate components, the illustrative embodiments also recognize that data processing system 200 may be a system-on-a-chip such that any combination of components may be provided on a single processor chip, such as NB/MCH 202, SB/ICH 204, processing unit 206, main memory 208, graphics processor 210, and/or LAN adapter 212.

Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

While not shown, data processing system may also be a logically partitioned platform. That is the hardware shown in data processing system 200 may be hardware in a logically partitioned platform. A logically partitioned platform includes partitioned hardware, multiple operating systems, and partition management firmware. The operating systems may be multiple copies of a single operating system or multiple heterogeneous operating systems simultaneously run on the logically partitioned platform. These operating systems may be implemented, for example, using OS/400, which is designed to interface with a virtualization mechanism, such as partition management firmware, e.g., a hypervisor. OS/400 is used only as an example in these illustrative embodiments. Of course, other types of operating systems, such as AIX® and Linux®, may be used depending on the particular implementation. The operating systems may be located in respective logical partitions.

Hypervisor software is an example of software that may be used to implement partition management firmware and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM). Thus, in the following description a reference to an operating system may also refer to an operation system and hypervisor combination.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As discussed previously, as computers and consumer electronics devices become more connected, platform security becomes increasingly important for everyone from consumers to businesses. While operating systems perform checks to determine whether software should be booted or not based on signatures, if the operation system becomes compromised, then the then entire data processing system is at risk. Further, if a processor and memory are securely dedicated, once the software becomes compromised, then the securely dedicated processor and memory are not accessible no matter how secure the processor and memory are. Thus, there is a need for secure reconfigurable logic that may be dynamically reconfigured providing both configuration internet protocol protection and protection of data during operation.

Figure 3A:
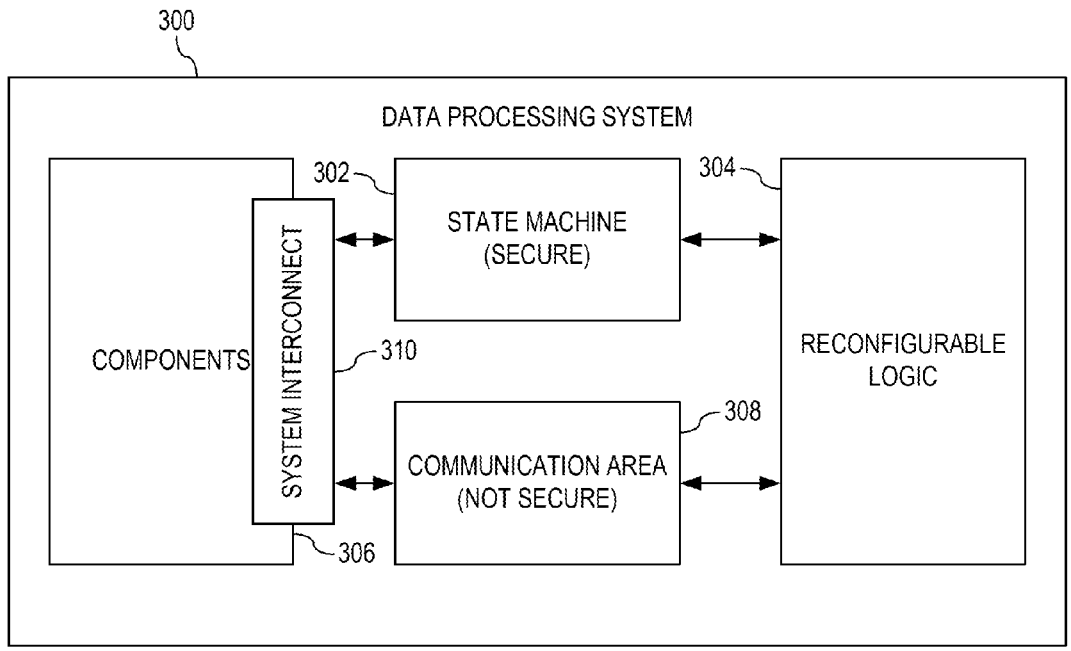
FIGS. 3A and 3B depict an exemplary implementation of a mechanism that provides secure dynamically reconfigurable logic in accordance with an illustrative embodiment.
Figure 3B:
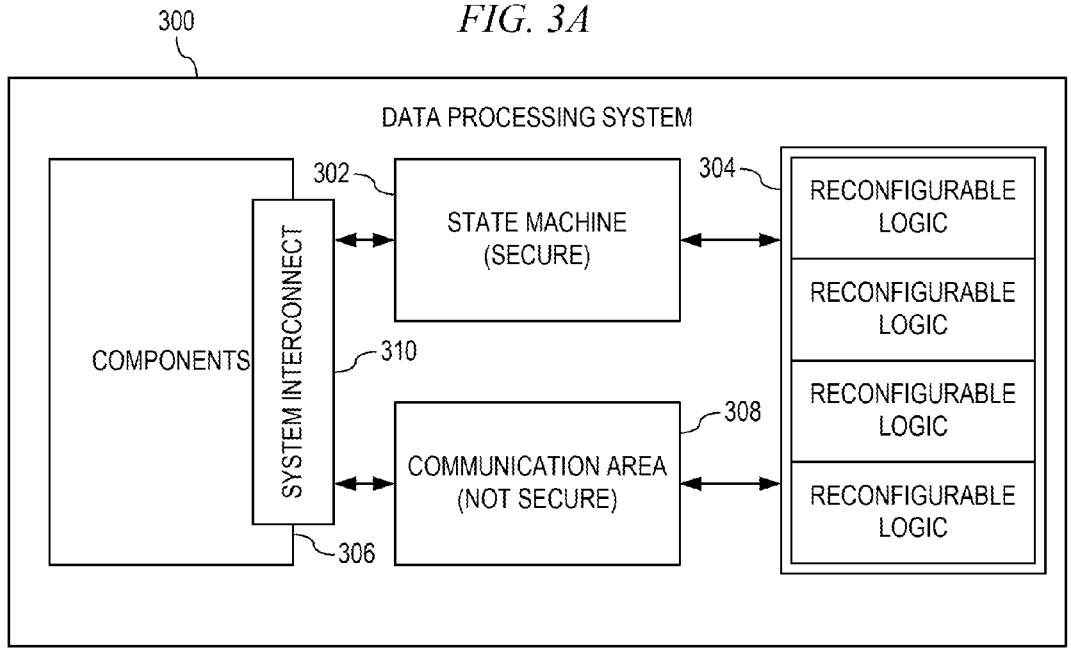

FIGS. 3A and 3B are exemplary block diagrams illustrating the main operational components and their interactions in accordance with one illustrative embodiment. The elements shown in FIGS. 3A and 3B may be implemented in hardware, software, or any combination of hardware and software. In illustrative preferred embodiment, the state machine and reconfigurable logic are implemented in hardware in combination with other hardware and software executing on or with one or more processors of one or more data processing devices or systems.

FIG. 3A depicts an exemplary implementation of a mechanism that provides secure dynamically reconfigurable logic in accordance with an illustrative embodiment. Data processing system 300 comprises state machine 302 and communication area 308 coupled between reconfigurable logic 304 and other components 306 within data processing system 300 that communicate with reconfigurable logic 304. State machine 302 and communication area 308 interface to components 306 in data processing system 300 using system interconnect 310. System interconnect 310 may be an on-chip bus that connects to multiple processor elements, a front-side bus, or other system fabric. Reconfigurable logic 304 may be any logic that is reconfigurable in a data processing system, such as logic reconfigurable by scanning, logic reconfigurable by writing configuration registers, logic for a reconfigurable data path, a field-programmable gate array (FPGA), which is an integrated circuit designed to be configured by the customer or designer after manufacturing, or the like.

In order to secure operations during initialization within data processing system 300, state machine 302 establishes a hardware boundary to reconfigurable logic 304 thereby forming isolated reconfigurable logic such that access is restricted so that reconfigurable logic 304 may only be written to by state machine 302. Once the boundary is established, state machine 302 clears out the prior state of reconfigurable logic 304. That is, state machine 302 clears any prior configuration of reconfigurable logic 304 such that the new configuration may be loaded. Once state machine 302 clears out the prior configuration out of reconfigurable logic 304, state machine 302 authenticates and optionally decrypts a new configuration from the requesting one of components 306 using a hardware root-of-trust key, which is never accessible by software. While the illustrative embodiments use a hardware root-of-trust key, one of ordinary skill in the art would recognize that any hardware authentication method may be used without departing from the spirit and scope of the invention.

After state machine 302 successfully authenticates and optionally decrypts the new configuration, state machine 302 attempts to load the new configuration into reconfigurable logic 304. If state machine 302 determines that authentication and optional decryption of the new configuration has failed or that the loading of the authenticated and optionally decrypted new configuration fails to successfully load within reconfigurable logic 304, state machine 302 clears any state of reconfigurable logic 304. State machine 302 then returns the reconfigurable logic to non-isolated state by re-opening the hardware boundary and signals the requesting one of components 306 that the loading of the new configuration was not successful.

If state machine 302 determines that the new configuration has been successfully loaded, state machine 302 then starts the operation of reconfigurable logic 304. If state machine 302 receives another configuration that is to be loaded into reconfigurable logic 304, state machine 302 first authenticates and optionally decrypts the other configuration from the requesting one of components 306 using a hardware root-of-trust key. If state machine 302 successfully authenticates and optionally decrypts the other configuration, state machine 302 then clears out the prior state of reconfigurable logic 304. State machine 302 then attempts to load the other configuration into reconfigurable logic 304. If state machine 302 determines that authentication and optional decryption of the other configuration has failed or that the loading of the authenticated and optionally decrypted other configuration fails to successfully load within reconfigurable logic 304, state machine 302 clears any state of reconfigurable logic 304. State machine 302 then returns reconfigurable logic 304 to non-isolated state by re-opening the hardware boundary and then signals the requesting one of components 306 that the loading of the other configuration was not successful. If state machine 302 determines that the other configuration has been successfully loaded, state machine 302 then starts the operation of reconfigurable logic 304.

In an alternative embodiment, state machine 302 may also respond to a request to simply clear the isolated logic in reconfigurable logic 304. Upon receiving a request from one of components 306 to clear any isolated logic in reconfigurable logic 304, state machine 302 halts the configurable logic 304, deletes the configuration and any other state in reconfigurable logic 304, returns reconfigurable logic 304 to a non-isolated state by re-opening the hardware boundary, and signals to the rest of the system that the request is complete and reconfigurable logic 304 is available to be reused either in secure or non-secure mode.

In another alternative embodiment, reconfigurable logic 304 may support multiple independently secure configurable domains as is shown in FIG. 3B. In this embodiment, state machine 302 determines which portion of reconfigurable logic 304 to load or clear based upon an identification of which securable domain is being targeted. If a new load is requested and reconfigurable logic 304 is already partitioned by a previous load or previous loads, state machine 302 may determine whether a securable domain is available to be loaded in reconfigurable logic 304 prior to loading the new configuration.

In yet another alternative embodiment, responsive to one secure configuration replacing an existing secure configuration, state machine 302 may clear any state of the existing secure configuration in reconfigurable logic 304 and load the new configuration without returning reconfigurable logic 304 to non-isolated state by re-opening the hardware boundary. Thus, the hardware boundary stays intact during the entire process.

Data processing system 300 also comprises communication area 308. Communication area 308 provides unsecure communication access of reconfigurable logic 304 to components 306, such as access to memory, processing, I/O, or the like. Communication area 308 also provides unsecure communication access to reconfigurable logic 304 from components 306, such as requesting operation to be performed by reconfigurable logic 304. Thus, communication between reconfigurable logic 304 and components 306, which represents a non-secure portion of data processing system 300, is restricted to communication area 308, which may be a set of registers, memory, or the like, that is readable and writeable by both reconfigurable logic 304 and components 306. Communication area 308 may also allow reconfigurable logic 304 direct access to the remainder of data processing system 300, by allowing main memory read/write commands originating in reconfigurable logic 304 with reads targeting communication area 308, or by providing direct memory access (DMA) that may be programmed by reconfigurable logic 304 to transfer data from system memory or I/O space to communication area 308. The restriction provided by communication area 308 ensures that there are no unknown communication paths into or out of reconfigurable logic 304 that could present an information/security leak. Therefore, none of the state or transitions inside reconfigurable logic 304 are observable except for modifications made by reconfigurable logic 304 to communication area 308, which is non-secure.

Thus, state machine 302 provides the ability to load and secure and dynamically reconfigure reconfigurable logic 304 with an authenticated and optionally encrypted configuration stored in or provided by one of the components in the system or its attached network. Thus, state machine 302 provides platform security, which is important to consumers and to businesses.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
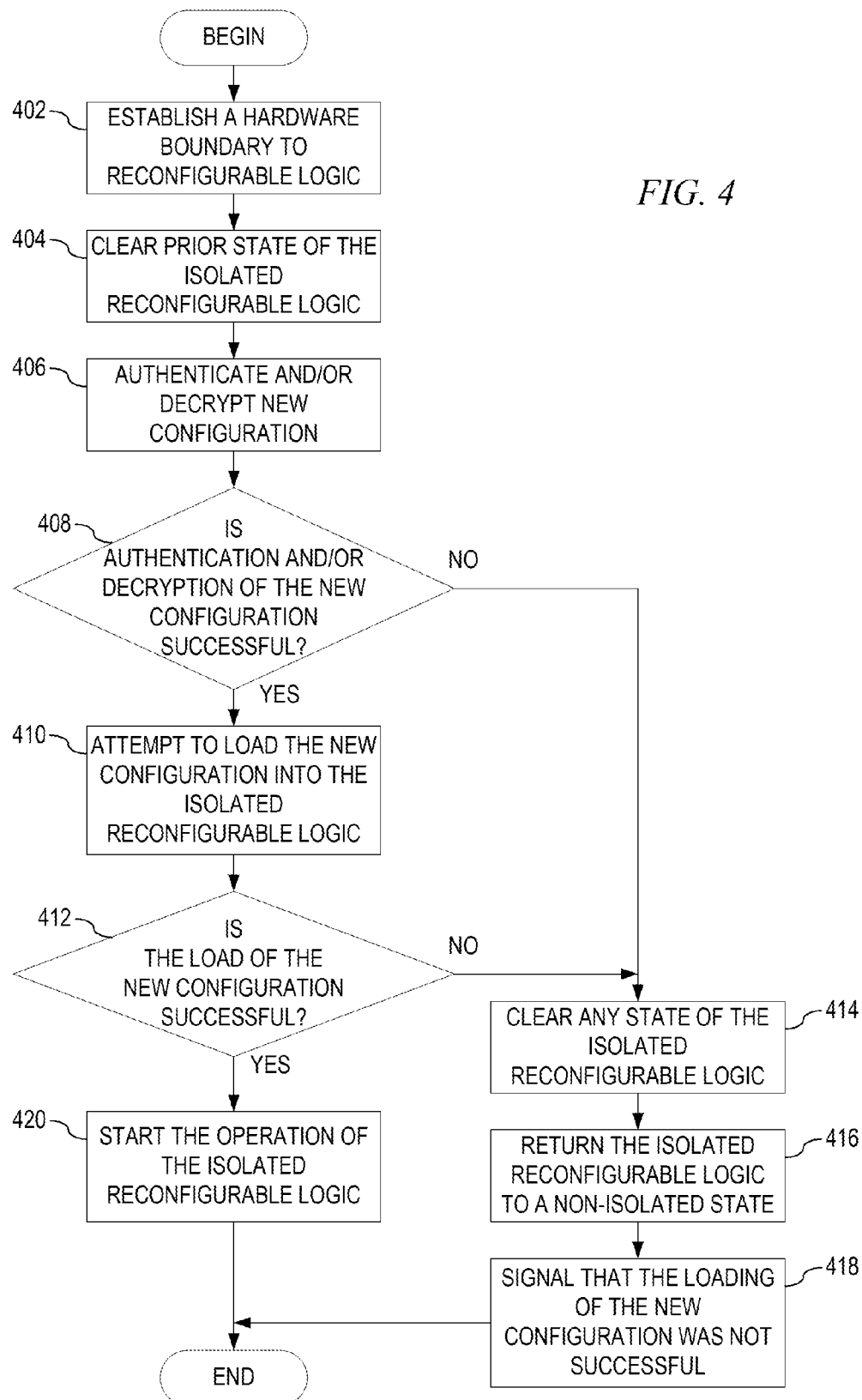
FIG. 4 provides a flowchart outlining example operations performed by a mechanism that provides secure dynamically reconfigurable logic during initialization of a data processing system in accordance with an illustrative embodiment.

Referring now to FIGS. 4-7, these figures provide flowcharts outlining example operations of a mechanism that provides secure dynamically reconfigurable logic in accordance with an illustrative embodiment. FIG. 4 provides a flowchart outlining example operations performed by a mechanism that provides secure dynamically reconfigurable logic during initialization of a data processing system in accordance with an illustrative embodiment. As the data processing system initializes and the operation begins, a state machine within the data processing system establishes a hardware boundary to reconfigurable logic within the data processing system thereby forming isolated reconfigurable logic such that the reconfigurable logic may only be written to by the state machine (step 402). With the boundary established, the state machine clears out the prior state of the isolated reconfigurable logic (step 404). That is, the state machine clears any prior configuration of isolated reconfigurable logic such that the new configuration may be loaded. With the prior configuration cleared out of the reconfigurable logic, the state machine authenticates and optionally decrypts a new configuration from the requesting component within data processing system (step 406).

The state machine then determines whether the authentication and optional decryption of the new configuration is successful (step 408). If at step 408 the authentication and optional decryption of the new configuration is successful, then the state machine attempts to load the new configuration into the isolated reconfigurable logic (step 410). The state machine then determines whether the load of the new configuration within the isolated reconfigurable logic is successful (step 412). If at step 408 the state machine determines that authentication and optional decryption of the new configuration has failed or if at step 412 the state machine determines that the loading of the authenticated and optionally decrypted new configuration fails to successfully load within the isolated reconfigurable logic, the state machine clears any state of the isolated reconfigurable logic (step 414). The state machine then returns the isolated reconfigurable logic to a non-isolated state by re-opening the hardware boundary (step 416) and signals the requesting component that the loading of the new configuration was not successful (step 418), with the operation terminating thereafter. If at step 412 the state machine determines that the new configuration has been successfully loaded, the state machine starts the operation of the isolated reconfigurable logic (step 420), with the operation terminating thereafter.

Figure 5:
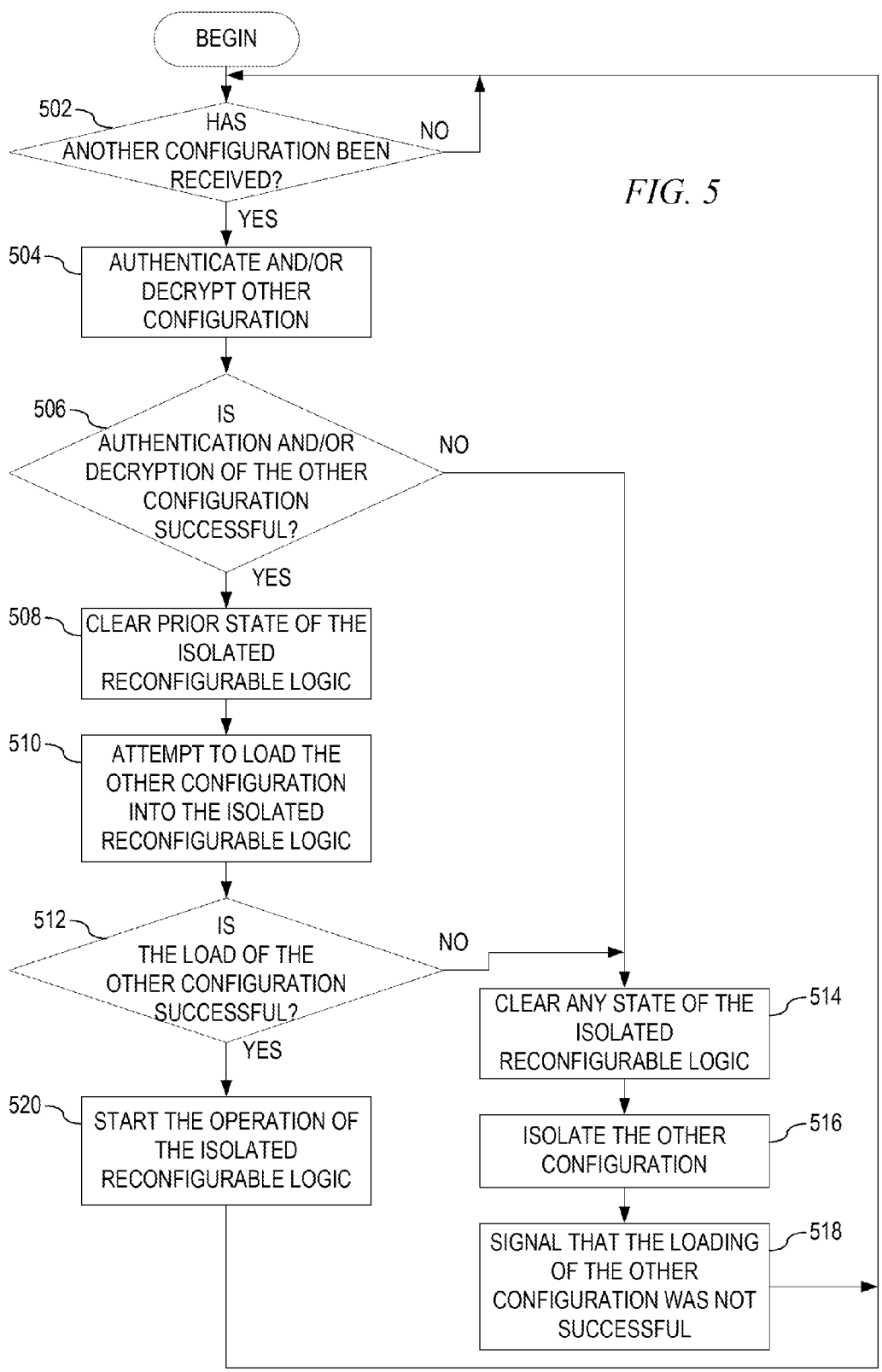
FIG. 5 provides a flowchart outlining example operations performed by a mechanism that provides secure dynamically reconfigurable logic to replace an existing configuration after the hardware boundary has been established in accordance with an illustrative embodiment.

FIG. 5 provides a flowchart outlining example operations performed by a mechanism that provides secure dynamically reconfigurable logic to replace an existing configuration after the hardware boundary has been established in accordance with an illustrative embodiment. As the operation begins, the state machine determines whether another configuration that is to be loaded into the isolated reconfigurable logic has been received (step 502). If at step 502 there is no other configuration received, then the operation returns to step 502. If at step 502 another configuration is received, the state machine first authenticates and optionally decrypts the other configuration from the requesting component of the data processing system (step 504). The state machine then determines whether the authentication and optional decryption of the other configuration is successful (step 506). If at step 506 the authentication and optional decryption of the other configuration is successful, the state machine then clears out the prior configuration of the isolated reconfigurable logic (step 508). The operation performed at step 508 may occur with or without returning the isolated reconfigurable logic to non-isolated state by re-opening the hardware boundary. If the isolated reconfigurable logic is returned to a non-isolated state by re-opening the hardware boundary, then the state machine will have to reestablish the hardware boundary to the reconfigurable logic.

The state machine then attempts to load the other configuration into the isolated reconfigurable logic (step 510). The state machine then determines whether the load of the other configuration within the isolated reconfigurable logic is successful (step 512). If at step 506 the state machine determines that authentication and optional decryption of the other configuration has failed or if at step 512 the state machine determines that the loading of the authenticated and optionally decrypted other configuration fails to successfully load within the isolated reconfigurable logic, the state machine clears any state of the isolated reconfigurable logic (step 514). The state machine then returns the isolated reconfigurable logic to non-isolated state by re-opening the hardware boundary (step 516) and signals the requesting component that the loading of the other configuration was not successful (step 518), with the operation returning to step 502 thereafter. If at step 512 the state machine determines that the other configuration has been successfully loaded, the state machine starts the operation of the isolated reconfigurable logic (step 520), with the operation returning to step 502 thereafter.

Figure 6:
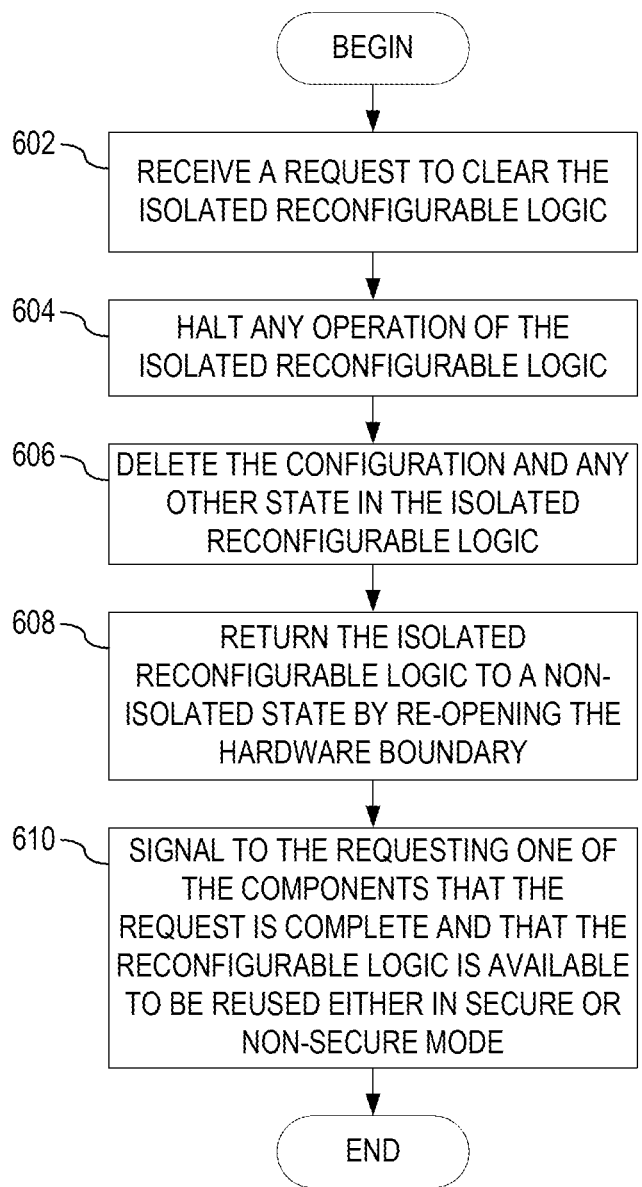
FIG. 6 provides a flowchart outlining example operations performed by a mechanism that provides secure dynamically reconfigurable logic to clear any existing configuration from the isolated reconfigurable logic and remove any hardware boundary that has been established in accordance with an illustrative embodiment.

FIG. 6 provides a flowchart outlining example operations performed by a mechanism that provides secure dynamically reconfigurable logic to clear any existing configuration from the isolated reconfigurable logic and remove any hardware boundary that has been established in accordance with an illustrative embodiment. As the operation begins, the state machine receives a request to clear the isolated reconfigurable logic (step 602). The state machine halts any operation of the isolated reconfigurable logic (step 604). The state machine deletes the configuration and any other state in the isolated reconfigurable logic (step 606). Then the state machine returns the isolated reconfigurable logic to a non-isolated state by re-opening the hardware boundary (step 608). Finally, the state machine signals to the requesting one of the components that the request is complete and that the reconfigurable logic is available to be reused either in secure or non-secure mode (step 610), with the operation terminating thereafter.

Figure 7:
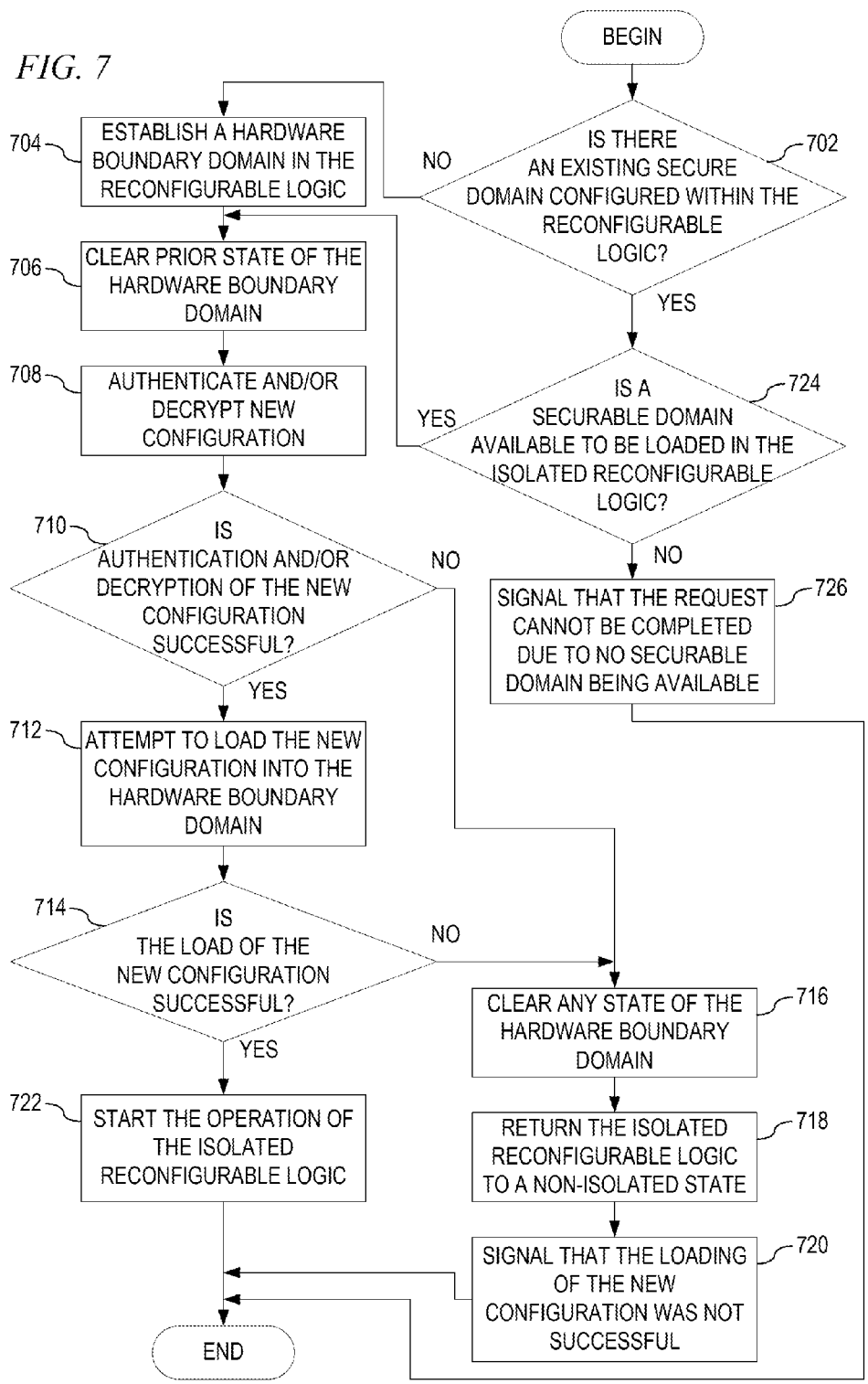
FIG. 7 provides a flowchart outlining example operations performed by a mechanism that provides secure dynamically reconfigurable logic during initialization of multiple independent secure domains within a data processing system in accordance with an illustrative embodiment.

FIG. 7 provides a flowchart outlining example operations performed by a mechanism that provides secure dynamically reconfigurable logic during initialization of multiple independent secure domains within a data processing system in accordance with an illustrative embodiment. As the operation beings, the state machine determines whether there is an existing secure domain configured within the reconfigurable logic (step 702). If at step 702 there is no secure configurable domain created, then the state machine establishes a hardware boundary domain in the reconfigurable logic within the data processing system thereby forming isolated reconfigurable logic such that the reconfigurable logic may only be written to by the state machine (step 704). With the hardware boundary domain established, the state machine clears out the prior state of the hardware boundary domain (step 706). The state machine then authenticates and optionally decrypts a new configuration from the requesting component within data processing system (step 708).

The state machine determines whether the authentication and optional decryption of the new configuration is successful (step 710). If at step 710 the authentication and optional decryption of the new configuration is successful, then the state machine attempts to load the new configuration into the hardware boundary domain (step 712). The state machine determines whether the load of the new configuration within the hardware boundary domain is successful (step 714). If at step 710 the state machine determines that authentication and optional decryption of the new configuration has failed or if at step 714 the state machine determines that the loading of the authenticated and optionally decrypted new configuration fails to successfully load within the isolated reconfigurable logic, the state machine clears any state of the hardware boundary domain (step 716). The state machine then returns the isolated reconfigurable logic to a non-isolated state by re-opening the hardware boundary (step 718) and signals the requesting component that the loading of the new configuration was not successful (step 720), with the operation terminating thereafter. If at step 714 the state machine determines that the new configuration has been successfully loaded, the state machine starts the operation of the isolated reconfigurable logic (step 722), with the operation terminating thereafter.

If at step 702 there is an existing secure domain already configured within the reconfigurable logic, then the state machine determines whether a securable domain is available to be loaded in the isolated reconfigurable logic prior to loading the new configuration (step 724). If at step 724 there is a securable domain available, then the operation proceeds to step 706. If at step 724 there is no securable domain available, then the state machine signals to the requesting one of the components that the request cannot be completed due to no securable domain being available (step 726), with the operation terminating thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a mechanism within a data processing system for securely and dynamically reconfiguring reconfigurable logic. The illustrative embodiments establish secure operations using a hardware state machine in the data processing system that establishes a hardware boundary such that the logic that is to be secured can only be written to by the hardware state machine. The hardware state machine clears out the prior state of the reconfigurable logic and authenticates and optionally decrypts a new configuration of the reconfigurable logic using a hardware root of trust (key). Upon successful load and authentication, the hardware state machine starts operation of the reconfigurable logic. If the load and/or the authentication is not successful, the hardware state machine, clears the state of the reconfigurable logic, returns the reconfigurable logic to non-isolated state, and signals that the isolated load operation was not successful. The illustrative embodiments also provide a communication area, which is considered to be unsecure, that is accessible by both the reconfigurable logic and other components within the data processing system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for securely and dynamically reconfiguring reconfigurable logic, the method comprising:
    establishing, by a state machine within the data processing system, a hardware boundary to the reconfigurable logic within the data processing system thereby forming isolated reconfigurable logic;
    clearing, by the state machine, any prior state existing within the isolated reconfigurable logic;
    authenticating, by the state machine, a new configuration to be loaded into the isolated reconfigurable logic;
    determining, by the state machine, whether the authentication of the new configuration is successful;
    responsive to the authentication of the new configuration being successful, loading, by the state machine, the new configuration into the isolated reconfigurable logic; and
    starting, by the state machine, operation of the isolated reconfigurable logic, wherein the hardware boundary restricts access such that the reconfigurable logic is only written to by the state machine and wherein none of the state or transitions inside the reconfigurable logic are observable except for modifications made by the reconfigurable logic to a non-secure communication area.

2. The method of claim 1, further comprising:
    determining, by the state machine, whether the load of the new configuration within the isolated reconfigurable logic is successful;
    responsive to the loading of the new configuration failing to successfully load within the isolated reconfigurable logic, clearing, by the state machine, any state of the isolated reconfigurable logic;
    returning, by the state machine, the isolated reconfigurable logic to a non-isolated state by re-opening the hardware boundary; and
    signaling, by the state machine, that the loading of the new configuration was not successful.

3. The method of claim 1, further comprising:
    responsive to the authentication of the new configuration failing, clearing, by the state machine, any state of the isolated reconfigurable logic;
    returning, by the state machine, the isolated reconfigurable logic to a non-isolated state by re-opening the hardware boundary; and
    signaling, by the state machine, that the loading of the new configuration was not successful.

4. The method of claim 1, further comprising:
    responsive to a request to clear the isolated reconfigurable logic, clearing, by the state machine, any state of the isolated reconfigurable logic;
    returning, by the state machine, the isolated reconfigurable logic to a non-isolated state by re-opening the hardware boundary; and
    signaling, by the state machine, that the reconfigurable logic has been cleared.

5. The method of claim 1, wherein the reconfigurable logic is at least one of a field-programmable gate array (FPGA), logic reconfigurable by scanning, logic reconfigurable by writing configuration registers, or logic for a reconfigurable data path.

6. The method of claim 1, further comprising:
    receiving, by the state machine, another configuration to be loaded into the isolated reconfigurable logic;
    authenticating, by the state machine, the other configuration to be loaded into the isolated reconfigurable logic;
    determining, by the state machine, whether the authentication of the new configuration is successful;
    responsive to the authentication of the other configuration being successful, clearing, by the state machine, the previous configuration existing within the isolated reconfigurable logic without returning the isolated reconfigurable logic to a non-isolated state;
    loading, by the state machine, the other configuration into the isolated reconfigurable logic; and starting, by the state machine, the operation of the isolated reconfigurable logic.

7. The method of claim 6, further comprising:

determining, by the state machine, whether the load of the other configuration within the isolated reconfigurable logic is successful;

responsive to the loading of the other configuration failing to successfully load within the isolated reconfigurable logic, clearing, by the state machine, any state of the isolated reconfigurable logic;

returning, by the state machine, the isolated reconfigurable logic to a non-isolated state by re-opening the hardware boundary; and signaling, by the state machine, that the loading of the other configuration was not successful.

8. The method of claim 6, further comprising:

responsive to the authentication or of the other configuration failing, clearing, by the state machine, any state of the isolated reconfigurable logic;

returning, by the state machine, the isolated reconfigurable logic to a non-isolated state by re-opening the hardware boundary; and signaling, by the state machine, that the loading of the other configuration was not successful.

9. A computer program product comprising a non-transitory computer readable storage medium having a computer readable program stored therein, wherein the computer readable program, when executed on a computing device, causes the computing device to:

establish a hardware boundary to reconfigurable logic within a data processing system thereby forming isolated reconfigurable logic;

clear any prior state existing within the isolated reconfigurable logic;

authenticate a new configuration to be loaded into the isolated reconfigurable logic;

determine whether the authentication of the new configuration is successful;

responsive to the authentication of the new configuration being successful, load the new configuration into the isolated reconfigurable logic; and start an operation of the isolated reconfigurable logic, wherein the hardware boundary restricts access such that the reconfigurable logic is only written to by the state machine and wherein none of the state or transitions inside the reconfigurable logic are observable except for modifications made by the reconfigurable logic to a non-secure communication area.

10. The computer program product of claim 9, wherein the computer readable program further causes the computing device to:

determine whether the load of the new configuration within the isolated reconfigurable logic is successful;

responsive to the loading of the new configuration failing to successfully load within the isolated reconfigurable logic, clear any state of the isolated reconfigurable logic;

return the isolated reconfigurable logic to a non-isolated state by re-opening the hardware boundary; and signal that the loading of the new configuration was not successful.

11. The computer program product of claim 9, wherein the computer readable program further causes the computing device to:

responsive to the authentication of the new configuration failing, clear any state of the isolated reconfigurable logic;

return the isolated reconfigurable logic to a non-isolated state by re-opening the hardware boundary; and signal that the loading of the new configuration was not successful.

12. The computer program product of claim 9, wherein the computer readable program further causes the computing device to:

responsive to a request to clear the isolated reconfigurable logic, clear any state of the isolated reconfigurable logic;

return the isolated reconfigurable logic to a non-isolated state by re-opening the hardware boundary; and signal that the reconfigurable logic has been cleared.

13. The computer program product of claim 9, wherein the computer readable program further causes the computing device to:

receive another configuration to be loaded into the isolated reconfigurable logic;

authenticate the other configuration to be loaded into the isolated reconfigurable logic;

determine whether the authentication of the new configuration is successful;

responsive to the authentication of the other configuration being successful, clear the previous configuration existing within the isolated reconfigurable logic without returning the isolated reconfigurable logic to a non-isolated state;

load the other configuration into the isolated reconfigurable logic; and start the operation of the isolated reconfigurable logic.

14. The computer program product of claim 13, wherein the computer readable program further causes the computing device to:

determine whether the load of the other configuration within the isolated reconfigurable logic is successful;

responsive to the loading of the other configuration failing to successfully load within the isolated reconfigurable logic, clear any state of the isolated reconfigurable logic;

return the isolated reconfigurable logic to a non-isolated state by re-opening the hardware boundary; and signal that the loading of the other configuration was not successful.

15. The computer program product of claim 13, wherein the computer readable program further causes the computing device to:

responsive to the authentication or of the other configuration failing, clear any state of the isolated reconfigurable logic;

return the isolated reconfigurable logic to a non-isolated state by re-opening the hardware boundary; and signal that the loading of the other configuration was not successful.

16. An apparatus, comprising:

a processor; and a memory coupled to the processor, wherein the memory comprises instructions which, when executed by the processor, cause the processor to:

establish a hardware boundary to reconfigurable logic within a data processing system thereby forming isolated reconfigurable logic;

clear any prior state existing within the isolated reconfigurable logic;

authenticate a new configuration to be loaded into the isolated reconfigurable logic;

determine whether the authentication of the new configuration is successful;

responsive to the authentication of the new configuration being successful, load the new configuration into the isolated reconfigurable logic; and start an operation of the isolated reconfigurable logic, wherein the hardware boundary restricts access such that the reconfigurable logic is only written to by the state machine and wherein none of the state or transitions inside the reconfigurable logic are observable except for modifications made by the reconfigurable logic to a non-secure communication area.

17. The apparatus of claim 16, wherein the instructions further cause the processor to:

determine whether the load of the new configuration within the isolated reconfigurable logic is successful;

responsive to the loading of the new configuration failing to successfully load within the isolated reconfigurable logic, clear any state of the isolated reconfigurable logic;

return the isolated reconfigurable logic to a non-isolated state by re-opening the hardware boundary; and signal that the loading of the new configuration was not successful.

18. The apparatus of claim 16, wherein the instructions further cause the processor to:

responsive to the authentication of the new configuration failing, clear any state of the isolated reconfigurable logic;

return the isolated reconfigurable logic to a non-isolated state by re-opening the hardware boundary; and signal that the loading of the new configuration was not successful.

19. The apparatus of claim 16, wherein the instructions further cause the processor to:

responsive to a request to clear the isolated reconfigurable logic, clear any state of the isolated reconfigurable logic;

return the isolated reconfigurable logic to a non-isolated state by re-opening the hardware boundary; and signal that the reconfigurable logic has been cleared.

20. The apparatus of claim 16, wherein the instructions further cause the processor to:

receive another configuration to be loaded into the isolated reconfigurable logic;

authenticate the other configuration to be loaded into the isolated reconfigurable logic;

determine whether the authentication of the new configuration is successful;

responsive to the authentication of the other configuration being successful, clear the previous configuration existing within the isolated reconfigurable logic without returning the isolated reconfigurable logic to a non-isolated state;

load the other configuration into the isolated reconfigurable logic; and start the operation of the isolated reconfigurable logic.

21. The apparatus of claim 20, wherein the instructions further cause the processor to:

determine whether the load of the other configuration within the isolated reconfigurable logic is successful;

responsive to the loading of the other configuration failing to successfully load within the isolated reconfigurable logic, clear any state of the isolated reconfigurable logic;

return the isolated reconfigurable logic to a non-isolated state by re-opening the hardware boundary; and signal that the loading of the other configuration was not successful.

22. The apparatus of claim 20, wherein the instructions further cause the processor to:

responsive to the authentication or of the other configuration failing, clear any state of the isolated reconfigurable logic;

return the isolated reconfigurable logic to a non-isolated state by re-opening the hardware boundary; and signal that the loading of the other configuration was not successful.

* * * * *